US010900806B2

(12) United States Patent
Park

(10) Patent No.: US 10,900,806 B2
(45) Date of Patent: Jan. 26, 2021

(54) METHOD FOR CALIBRATION OF GYRO SENSOR USING TILT SENSOR

(71) Applicant: WIWORLD CO., LTD., Daejeon (KR)

(72) Inventor: Changoo Park, Daejeon (KR)

(73) Assignee: WIWORLD CO., LTD., Daejeon (KR)

(*) Notice: Subject to any disclaimer, the term of this patent is extended or adjusted under 35 U.S.C. 154(b) by 207 days.

(21) Appl. No.: 16/076,966

(22) PCT Filed: Feb. 10, 2017

(86) PCT No.: PCT/KR2017/001457
§ 371 (c)(1),
(2) Date: Sep. 6, 2018

(87) PCT Pub. No.: WO2017/138759
PCT Pub. Date: Aug. 17, 2017

(65) Prior Publication Data
US 2019/0056239 A1 Feb. 21, 2019

(30) Foreign Application Priority Data

Feb. 12, 2016 (KR) .................. 10-2016-0016088

(51) Int. Cl.
G01C 25/00 (2006.01)
G01P 15/14 (2013.01)
G01P 21/02 (2006.01)
G01P 21/00 (2006.01)
G01C 19/5726 (2012.01)
(52) U.S. Cl.
CPC ....... G01C 25/005 (2013.01); G01C 19/5726 (2013.01); G01P 15/14 (2013.01); G01P 21/00 (2013.01); G01P 21/02 (2013.01)

(58) Field of Classification Search
CPC .............. G01C 25/005; G01C 19/5726; G01C 19/5776; G01P 21/00
USPC ....... 73/1.37, 1.38, 1.41, 1.75, 1.77, 504.12, 73/504.08, 504.09, 504.11
See application file for complete search history.

(56) References Cited

U.S. PATENT DOCUMENTS

2007/0103366 A1* 5/2007 Park .................... G01S 3/42
342/359

FOREIGN PATENT DOCUMENTS

| JP | H0611353 A | 1/1994 |
| JP | H07249918 A | 9/1995 |
| JP | H1123298 A | 1/1999 |
| JP | 2013079856 A | 5/2013 |

(Continued)

OTHER PUBLICATIONS

ISA Korean Intellectual Property Office, International Search Report Issued in Application No. PCT/KR2017/001457, dated Apr. 21, 2017, WIPO, 4 pages.

Primary Examiner — Robert R Raevis
(74) Attorney, Agent, or Firm — McCoy Russell LLP

(57) ABSTRACT

The present invention relates to a method for calibration of a gyro sensor which controls the attitude of a device such as an antenna by detecting acceleration with respect to three axis directions and, more particularly, to a method for calibration of a gyro sensor, in which the calibration of the gyro sensor is performed by interworking with a tilt sensor. In particular, it is possible to calibrate the gyro sensor, which detects rotation with respect to a Z-axis by standing a sensor board provided with a sensor, by interworking with a tilt sensor.

1 Claim, 4 Drawing Sheets

(56) References Cited

FOREIGN PATENT DOCUMENTS

KR    1020050051525 A    6/2005
KR      20100005346 A    1/2010

* cited by examiner

METHOD FOR CALIBRATION OF GYRO SENSOR USING TILT SENSOR

CROSS-REFERENCE TO RELATED APPLICATIONS

The present application is a U.S. National Phase of International Patent Application Serial No. PCT/KR2017/001457 entitled "METHOD FOR CALIBRATION OF GYRO SENSOR USING TILT SENSOR," filed on Feb. 10, 2017. International Patent Application Serial No. PCT/KR2017/001457 claims priority to Korean Patent Application No. 10-2016-0016088, filed on Feb. 12, 2016. The entire contents of each of the above-cited applications are hereby incorporated by reference in their entirety for all purposes.

TECHNICAL FIELD

The present invention relates to a calibration method of a gyro sensor for detecting acceleration with respect to three-axis directions to perform attitude control of a device such as an antenna and, more particularly, to a calibration method of a gyro sensor, which is operatively associated with a tilt sensor for measuring a tilt with respect to gravity during calibration of a gyro sensor to highly enhance calibration accuracy.

BACKGROUND ART

A mobile satellite tracking antenna system installed in a vehicle, a ship, or the like controls an antenna unit to always be directed toward a satellite via attitude control using an antenna sensor due to high gain of an antenna.

In detail, a sensor installed in the mobile satellite tracking antenna system may include a plurality of gyro sensors and tilt sensors and may detect a degree by which an antenna unit is tilted with respect to each of three-axis directions by detecting movement of the antenna unit with respect to each direction to enable a driver to perform attitude control of the antenna unit. In this case, a terrestrial magnetism sensor or an altitude sensor may be additionally included to acquire additional information.

The prior art thereof is disclosed in Korean Patent Laid-Open Publication No. 2010-0005346. The prior art relates to an antenna stabilization device for maintaining directivity of an antenna toward a satellite and accurately tracking the satellite using a tilt sensor for detecting tilt and a gyro sensor for performing wind pressure attitude control.

However, the prior art does not disclose information on calibration of a sensor. In the case of a tilt sensor, there is no problem in that an error rate barely occurs without calibration but, in the case of a gyro sensor, the gyro sensor has characteristics whereby an output value is finely changed depending on an external environment such as surrounding temperature or humidity and, thus, a calibration operation is required prior to use.

To calibrate a gyro sensor, a current state needs to be a state in which there is no external motion. Accordingly, a method of calling an initial default value from a memory when there is a motion during calibration is applied to a conventional mobile satellite tracking antenna. Such a method is not capable of reflecting a change in external environment and, thus, there is a problem in that an error inevitably occurs in an output value of a gyro sensor.

As such, there is a problem in that, tracking accuracy of a mobile satellite tracking antenna system that is operatively associated with a sensor is abruptly degraded when the sensor does not appropriately perform calibration.

DISCLOSURE

Technical Problem

An object of the present invention is to provide a calibration method of a gyro sensor, which is operatively associated with a tilt sensor to calibrate a gyro sensor in such a way that an error barely occurs even if there is a minute motion during calibration.

Technical Solution

In one general aspect, a method of calibrating three gyro sensors included in a sensor board attached and installed to a target object and configured to respectively detect angular velocity with respect to X-axis, Y-axis, and Z-axis directions based on the sensor board, using a tilt sensor included in the sensor board and configured to detect a tilt with respect to gravity may include a) supplying power to a driver for driving the target object (S100), b) maintaining the sensor board in a horizontal state with respect to the ground by the tilt sensor (S200), c) determining whether the target object is moved (S300), and d) when there is a motion (S300-Y), applying an output value of the tilt sensor to calibrate the gyro sensor.

When the target object is moved (S300-Y), operation d) may include d-1) setting a zero point of a first gyro sensor for detecting rotation with respect to the X-axis direction and a second gyro sensor for detecting rotation with respect to the Y-axis direction using tilt data received from the tilt sensor (S411), d-2) positioning upright the sensor board in the horizontal state to change the horizontal state to a vertical state (S412), and d-3) setting a zero point of a third gyro sensor for detecting rotation with respect to the Z-axis direction using the tilt data received from the tilt sensor (S413).

Operation c) may include determining that the target object is moved when an output value of the gyro sensor is changed during a predetermined time period and determining that the target object is not moved when the output value is constant.

Lastly, when the target object is not moved (S300-N), operation d) may include setting each output value of the gyro sensors, received in operation c), as a zero point (S420).

Advantageous Effects

According to the present invention, calibration of a gyro sensor may be performed in association with a tilt sensor and, in particular, a sensor board including a sensor may be positioned upright and, thus, a gyro sensor for detecting rotation with respect to the Z-axis direction performs calibration in association with the tilt sensor.

Accordingly, even if there is no external motion, calibration of the gyro sensor may be accurately performed and, thus, an error barely occurs due to a change in external environment and, accordingly, when the present invention is applied to a satellite tracking antenna system, tracking accuracy may be excellent.

BEST MODE

The present invention will now be described more fully with reference to the accompanying drawings, in which exemplary embodiments of the invention are shown.

The accompanying drawings are merely examples shown for explanation of technical features of the present invention and, thus, the technical features are not limited to the accompanying drawings.

Figure 1:
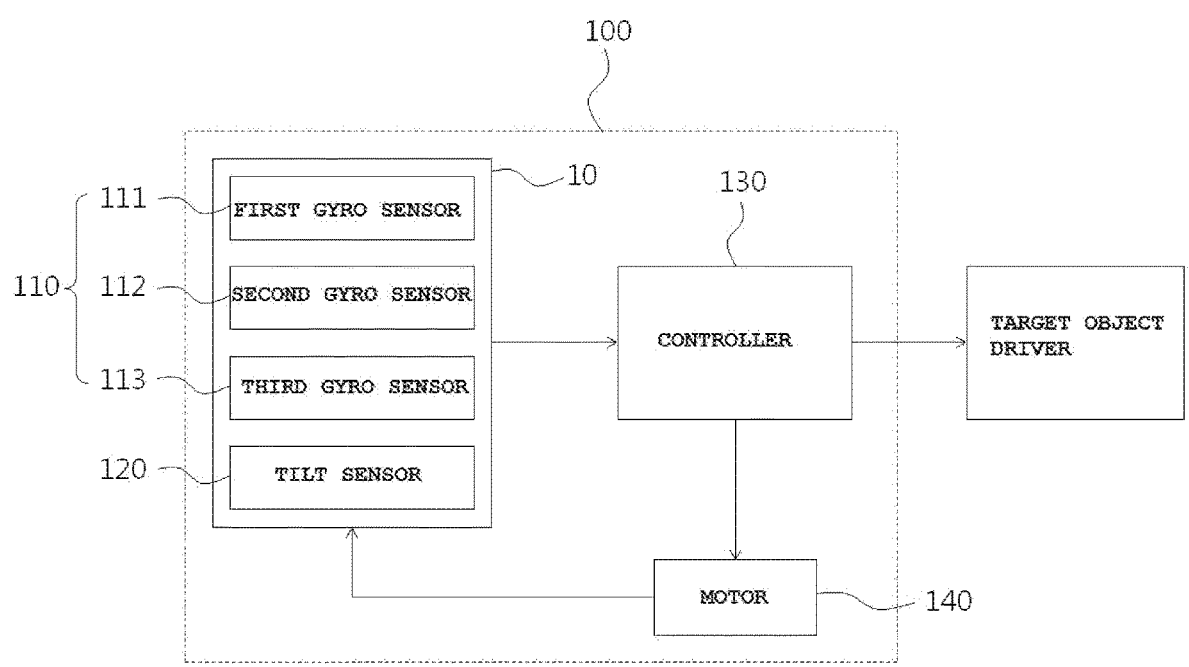
FIG. 1 is a schematic diagram showing a structure of a device for performing calibration of a gyro sensor according to an exemplary embodiment of the present invention.
Figure 2:
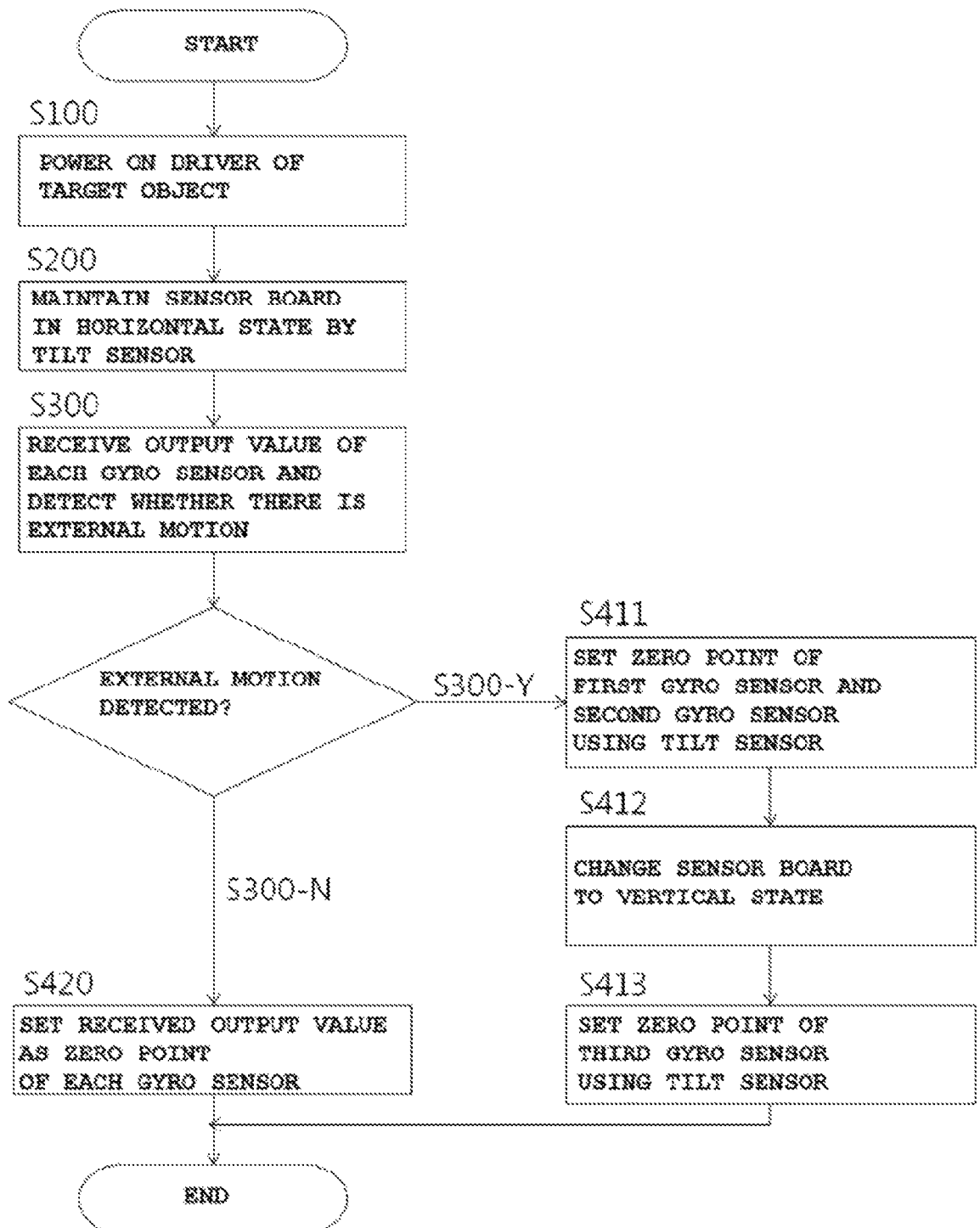
FIG. 2 is a flowchart of a calibration method of a gyro sensor according to an exemplary embodiment of the present invention.
Figure 3:
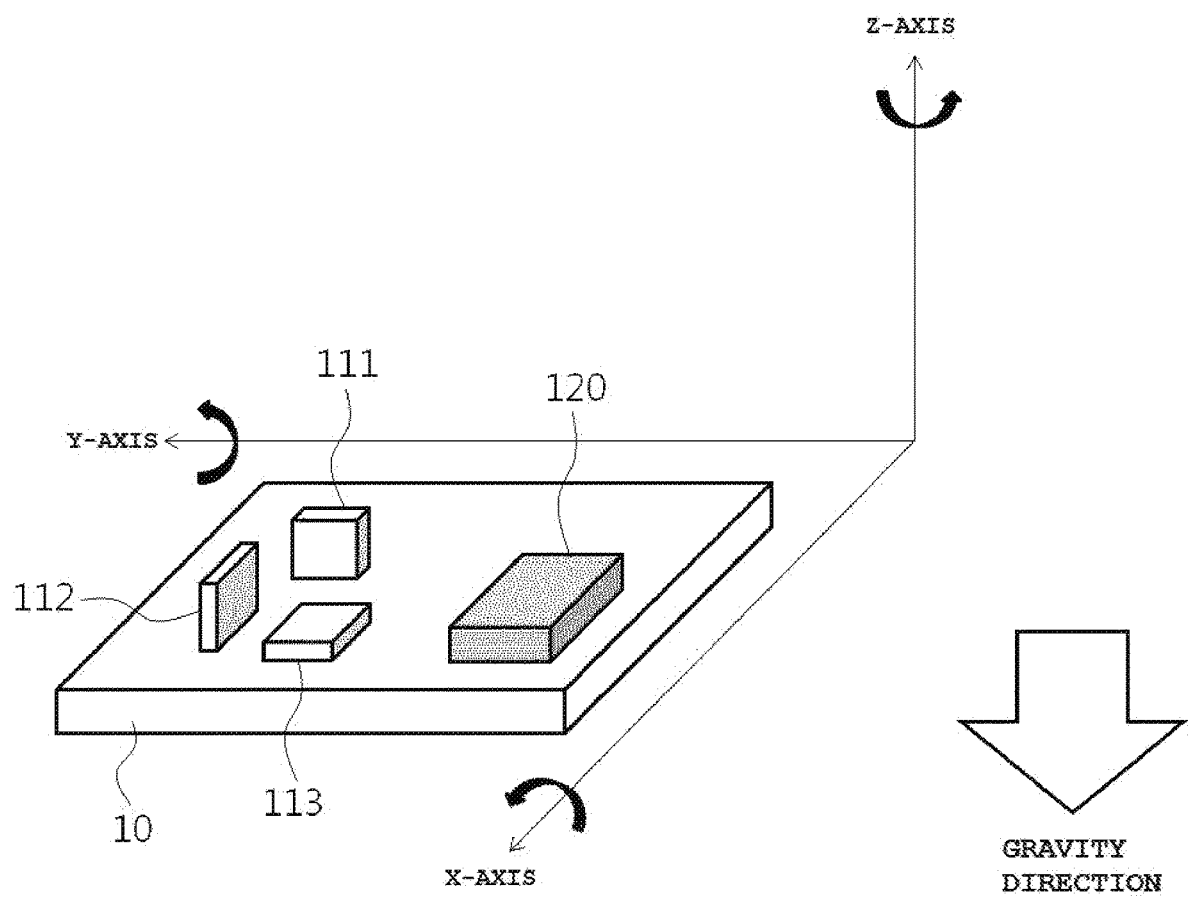
FIGS. 3 and 4 show an example of rotation and directions of a sensor board according to an exemplary embodiment of the present invention.
Figure 4:
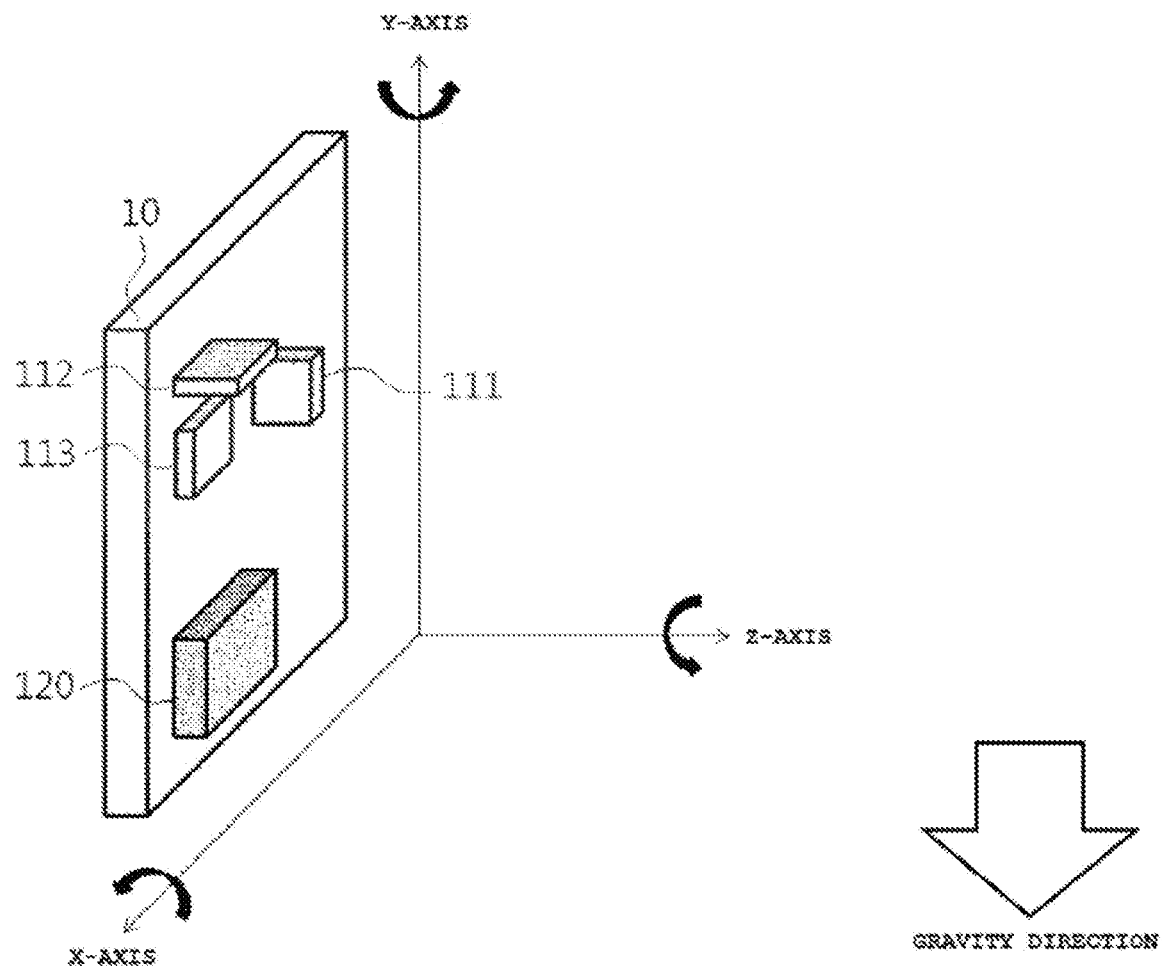

FIG. 1 is a schematic diagram showing a structure of a device 100 for performing calibration of a gyro sensor 110 according to an exemplary embodiment of the present invention. FIG. 2 is a flowchart of a calibration method of the gyro sensor 110 according to an exemplary embodiment of the present invention. FIGS. 3 and 4 show an example of rotation and directions of a sensor board 10 according to an exemplary embodiment of the present invention.

First, the structure of the device 100 for calibration is described with reference to FIG. 1 and, then, the calibration method of the gyro sensor according to the present invention is sequentially described.

First, the sensor board 10 configured to include various sensors is attached and installed to a target object to control a posture of the target object, detects a motion of the target object and, simultaneously, transmits a signal corresponding to the detected motion to a driver of the target object to control the posture of the target object.

As a detailed example, the target object may be an antenna unit of a mobile satellite tracking antenna system, which is always directed toward a satellite. To maximize gain of the antenna, even if there is an external motion, the antenna unit needs to be controlled to always be directed toward the satellite and, thus, a sensor board including various sensors is installed at a predetermined position of the antenna unit to control a posture of the antenna unit.

As shown in FIG. 3, when the X-axis, Y-axis, and Z-axis directions are set based on the sensor board 10, the device 100 may include a first gyro sensor 111, a second gyro sensor 112, a third gyro sensor 113, which detect angular velocity (rotation) in the respective directions. In this case, in the specification, the X-axis, Y-axis, and Z-axis directions may refer to three directions based on the sensor board 10 and a plane on which the sensor board 10 is disposed may be set as a reference plane.

In detail, the first gyro sensor 111 may be disposed in parallel to the Y-axis direction of the sensor board 10 and in a perpendicular direction to the reference plane and may detect angular velocity (rotation) based on the X-axis direction. The second gyro sensor 112 may be disposed in parallel to the X-axis direction of the sensor board 10 and in a perpendicular direction to the reference plane and may detect angular velocity based on the Y-axis direction. Lastly, the third gyro sensor 113 may be horizontally disposed on the reference plane. The device 100 may include a tilt sensor 120 for detecting tilt with respect to gravity on the sensor board 10 in addition to the three gyro sensors 110.

According to the present invention, a controller 130 may receive a signal output from sensors and may apply a signal to the driver of the target object based on the received signal to control a posture of the target object. The controller 130 may also be connected to a motor 140 for controlling a posture of the sensor board 10, which is described below in detail.

The present invention relates to a calibration method of a sensor for attitude control of a target object, in particular, a calibration method of the gyro sensor 110 and relates to a calibration method, in which an error barely occurs, using the tilt sensor 120 during calibration of a gyro sensor even if there is an external motion during calibration.

Calibration refers to correction of a zero point of a sensor and, generally, a gyro sensor is a sensor for outputting a voltage in the range of 0 to 5 V depending on a rotation degree. The controller 130 may recognize an output voltage as a numeral of 0 to 1024 via analog-digital (A-D) conversion. When an output value of a gyro sensor is an intermediate value, i.e., 512, it may be determined that there is no motion and a value of 512 may be set to a zero point.

Ideally, when there is no motion when power is supplied to the gyro sensor 110, a value of 512 needs to be received but, even if there is no motion due to influence of a surrounding environment (temperature, humidity, etc.), a value of 512 may not be output and, instead, for example, a value of 505 may be output and may be set as a zero point.

As such, to compensate for an error due to an external environment, the gyro sensor 110 may be initially calibrated and, hereinafter, according to an exemplary embodiment of the present invention, a calibration method of a gyro sensor is sequentially described.

As shown in FIG. 2, when power is supplied to a driver for driving a target object (S100), sensors may output measurement values. In this case, the sensor board 10 may be maintained in a horizontal state with respect to the ground by the tilt sensor 120 (S200). As described above, the tilt sensor 120 outputs an almost accurate value without calibration and, thus, the controller 130 may recognize a tilt degree with respect to the ground using the value received from the tilt sensor 120 to maintain the sensor board 10 in a horizontal state.

Then, the controller 130 may determine whether the target object is moved (S300). In this case, whether the target object is moved may be determined by an output value of each gyro sensor 110 and, thus, the controller 130 may determine that the target object is moved when an output value of at least one gyro sensor 110 is changed during a predetermined time period and may determine that the target object is not moved when the output value is constant.

When the target object is not moved (S300-N), a pre-received output value of the gyro sensor 110 is constant and, thus, each received output value may be set as a zero point (S420).

However, when the target object is moved (S300-Y), the output value of the tilt sensor 120 may be applied and calibration of the gyro sensor 110 may be performed. This procedure may include three operations as shown in the drawing.

First, a zero point of the first gyro sensor 111 for detecting rotation with respect to the X-axis direction and the second gyro sensor 112 for detecting rotation with respect to the Y-axis direction may be set using the output value (a tilt degree with respect to a gravity direction) received from the tilt sensor 120 (S411).

That is, as shown in FIG. 3, when the sensor board 10 is positioned, the tilt sensor 120 is capable of measuring a tilt with respect to the X-axis direction and the Y-axis direction and, thus, the zero point of the first gyro sensor 111 and the second gyro sensor 112, which corresponds to each measurement value, may be set.

The sensor board 10 is maintained in a horizontal state and, thus, calibration (S411) of the first gyro sensor 111 and the second gyro sensor 112 may be automatically performed in a previous operation of determination of whether the target object is moved, needless to say.

However, a tilt with respect to the Z-axis direction is outside a detection region of the tilt sensor 120 and, in this operation, it may not be possible to calibrate the third gyro sensor 113.

According to the present invention, to overcome the above problem, calibration of the first gyro sensor 111 and the second gyro sensor 112 is performed and, then, the controller 130 may apply a signal to the motor 140 to position the sensor board 10 upright and to change a horizontal state of the sensor board 10 to a vertical state (S412). That is, the sensor board 10 may be rotated from the state shown in FIG. 3 by 90 degrees as shown in FIG. 4.

In this case, in the present invention, the X-axis, the Y-axis, and the Z-axis are set based on the sensor board 10 and, thus, are arranged as shown in FIG. 4.

The tilt sensor 120 is a sensor for detecting a tilt with respect to a gravity direction and, thus, when the sensor board 10 becomes in a vertical state as shown in FIG. 4, the tilt sensor 120 may measure a tilt with respect to the Z-axis.

Accordingly, lastly, the controller 130 may set the zero point of the third gyro sensor 113 for detecting rotation with respect to the Z-axis direction using the measurement value received from the tilt sensor 120.

That is, in a state in which the sensor board 10 is horizontally positioned with respect to the ground, the sensor board 10 is not operatively associated with the tilt sensor 120 and, thus, it may not be possible to accurately calibrate the tilt sensor 120 but, when the sensor board 10 is positioned upright in a vertical direction and, then, is operatively associated with the tilt sensor 120, it may also be possible to calibrate the third gyro sensor 113 as well as the first gyro sensor 111 and the second gyro sensor 112.

In this case, the controller 130 may also control a posture of the target object to control the target object to be moved to correspond to an external motion during a procedure in which the sensor board 10 is changed to a vertical state for calibration of the third gyro sensor 113. Accordingly, even if there is an external motion, calibration of the third gyro sensor 113 may be effectively performed.

Conventionally, when there is an external motion, it is not possible to calibrate a gyro sensor and, thus, a pre-stored default value is set as a zero point and, thus, it is not possible to accurately perform attitude control of a target object.

According to the present invention, calibration of the gyro sensor 110 may be performed in association with the tilt sensor 120 through the aforementioned series of operations and, in particular, the sensor board 10 including a sensor may be positioned upright in such a way that the third gyro sensor 113 for detecting rotation with respect to the Z-axis direction may also be capable of performing calibration in association with the tilt sensor 120.

Accordingly, even if there is an external motion, a gyro sensor may be accurately calibrated and, thus, an error due to a change in external environment barely occurs and, accordingly, when the present invention is applied to a satellite tracking antenna system, tracking accuracy may be excellent.

The present invention is not limited to the abovementioned exemplary embodiments, but may be variously applied. In addition, the present invention may be variously modified by those skilled in the art to which the present invention pertains without departing from the gist of the present invention claimed in the claims.

DETAILED DESCRIPTION OF MAIN ELEMENTS

10: sensor board
100: calibration device
110: gyro sensor
120: tilt sensor
130: controller
140: motor

The invention claimed is:

1. A method of calibrating three gyro sensors disposed on a sensor board attached and installed to a target object and configured to respectively detect angular velocity with respect to X-axis, Y-axis, and Z-axis directions based on the sensor board, using a tilt sensor disposed on the sensor board and configured to detect a tilt with respect to gravity, the method comprising:

a) supplying power to a driver for driving the target object and receiving output values of the three gyro sensors and the tilt sensor (S100);

b) maintaining the sensor board in a horizontal state with respect to the ground by the output value of the tilt sensor such that the Z-axis direction based on the sensor board is parallel to the direction of gravity (S200);

c) determining whether the target object is moved by identifying a variation of the output value of at least one of the three gyro sensors during a predetermined time period (S300); and d) setting zero points of the three gyro sensors by using the output value of the tilt sensor in response to determining that the target object is moved by identifying the variation of the output value of at least one of the three gyro sensors (S410), wherein the three gyro sensors having a first gyro sensor for detecting angular velocity with respect to the X-axis direction, a second gyro sensor for detecting angular velocity with respect to the Y-axis direction and a third gyro sensor for detecting angular velocity with respect to the axis direction, wherein operation d) comprises:

d-1) setting a zero point of the first gyro sensor and a zero point of the second gyro sensor by using the output value of the tilt sensor (S411), d-2) positioning upright the sensor board in the horizontal state to change the horizontal state to a vertical state such that the X-axis direction or the Y-axis direction based on the sensor board is parallel to the direction of gravity (S412), and d-3) setting a zero point of the third gyro sensor by using the out value of the tilt sensor (S413).

* * * * *